United States Patent
Stevens

[15] 3,648,587
[45] Mar. 14, 1972

[54] FOCUS CONTROL FOR OPTICAL INSTRUMENTS

[72] Inventor: Guy William W. Stevens, Berkhamstead, England

[73] Assignee: Eastman Kodak Company, Rochester, N.Y.

[22] Filed: Oct. 10, 1968

[21] Appl. No.: 776,300

[30] Foreign Application Priority Data

Oct. 20, 1967 Great Britain.....................47,867/67

[52] U.S. Cl. .................................95/44 R, 73/37.7, 350/204
[51] Int. Cl. ..........................................................G03b 3/00
[58] Field of Search .................331/94.5; 73/37.5, 37.6, 37.7; 95/44; 350/204

[56] References Cited

UNITED STATES PATENTS

| | | | |
|---|---|---|---|
| 3,081,682 | 3/1963 | Khoury | 95/44 X |
| 3,153,204 | 10/1964 | Dunsmuir | 331/94.5 |
| 3,194,055 | 7/1965 | Knobel | 73/37.7 X |
| 3,343,459 | 9/1967 | Jacobsen | 73/37.7 X |
| 3,482,433 | 12/1969 | Gladwyn | 73/37.5 |
| 3,519,334 | 7/1970 | Heitmann et al. | 73/37.5 X |

FOREIGN PATENTS OR APPLICATIONS 1,018,294 1/1966 Great Britain.........................331/94.5

*Primary Examiner*—Samuel S. Matthews
*Assistant Examiner*—Kenneth C. Hutchison
*Attorney*—Walter O. Hodsdon, P. R. Holmes and W. E. Jackson

[57] ABSTRACT

A method and apparatus particularly for making minute and very accurate images such as the negatives which are printed on photoresists in the production of microelectronic circuits. The method and apparatus employ an objective lens assembly adapted to be positioned in close proximity to a photographic emulsion layer, for focusing thereon an image of an object to be copied. In combination with the objective lens assembly there is provided a source of liquid, the liquid being of approximately the same refractive index as that of the emulsion and of a type that will not cause the emulsion to swell, and a liquid supply nozzle mounted for movement with the assembly and adapted to discharge the liquid so that a liquid stream fills the space between the assembly and the emulsion layer with a continuously renewed pool of liquid. There is further provided in combination with the assembly a device for sensing the pressure of the liquid in the nozzle so that the distance between the assembly and the emulsion layer may be monitored by noting variations in the liquid pressure in the nozzle from that obtained when the emulsion is correctly spaced.

15 Claims, 3 Drawing Figures

Patented March 14, 1972

3,648,587

GUY W. W. STEVENS
INVENTOR.

BY

ATTORNEYS & AGENT

Patented March 14, 1972 3,648,587

GUY W. W. STEVENS
INVENTOR.

BY

ATTORNEYS & AGENT

FOCUS CONTROL FOR OPTICAL INSTRUMENTS

This invention relates to optical instruments and to methods for microphotography, for producing greatly reduced high-resolution photographic copies.

In the production of microelectronic circuits using photoresists it is necessary to produce master negatives containing minute and very accurate images. High power microscope objectives may be used for this purpose, the objective being spaced a centimeter or less from the point of image formation on the photographic emulsion surface. When accurate focusing is required serious errors are produced if the focusing is not varied to take account of departures from flatness of the emulsion surfaces on a support of glass or film which are successively positioned in front of the objective.

It is an object of the present invention to provide an optical instrument and method for producing such photographic copies, in which the spacing of the objective lens assembly and photographic emulsion surface may be monitored.

According to one aspect of the present invention there is provided an optical instrument for use in producing a greatly reduced high-resolution photographic copy of an object which includes an objective lens assembly adapted to be positioned in proximity to a photographic emulsion layer to focus an image thereon of the object to be copied, in combination with a liquid supply nozzle mounted to move with the objective lens assembly in relation to the photographic emulsion layer and adapted to direct a stream of liquid into contact with the correctly positioned photographic emulsion layer and to fill the space between this layer and the objective lens assembly with the liquid, and a connection adapted to be connected to means for indicating variations in the venting of liquid from the nozzle from that obtaining when the objective lens assembly is correctly spaced from the photographic emulsion layer.

The nozzle may surround the objective lens assembly coaxially and have a single outlet opening arranged to face the photographic emulsion layer during operation. Alternatively the nozzle may have several outlet openings equally spaced about the nozzle axis and arranged to face the photographic emulsion layer during operation.

The objective lens assembly may comprise at least one lens from and a transparent cover element airspaced therefrom wherein the element can be contacted by the liquid during operation, or the objective lens assembly may be of the liquid immersion type having a lens surface adapted to be contacted by the liquid during operation. The objective lens assembly will be sealed to prevent the liquid from entering between the optical elements thereof.

According to another aspect of the invention, in the production of a greatly reduced high-resolution photographic copy of an object using an objective lens assembly to focus an image of the object on a photographic emulsion layer there is provided the improved method of monitoring the spacing of the objective lens assembly and the said layer and maintaining a dust-free zone therebetween which comprises directing a stream of liquid into contact with the photographic emulsion layer from a liquid supply nozzle mounted to move with the objective lens relative to the layer, such that the liquid fills the space between the layer and the objective lens assembly when they are correctly spaced, and sensing variations in the venting of liquid from the nozzle from that obtaining when the objective lens assembly is correctly spaced from the layer.

Preferably the liquid has approximately the same refractive index as the photographic emulsion.

Two embodiments of optical instrument for microphotography in accordance with the present invention will now be described by way of example with reference to the diagrammatic figures of the accompanying drawing in which.

Figure 1:
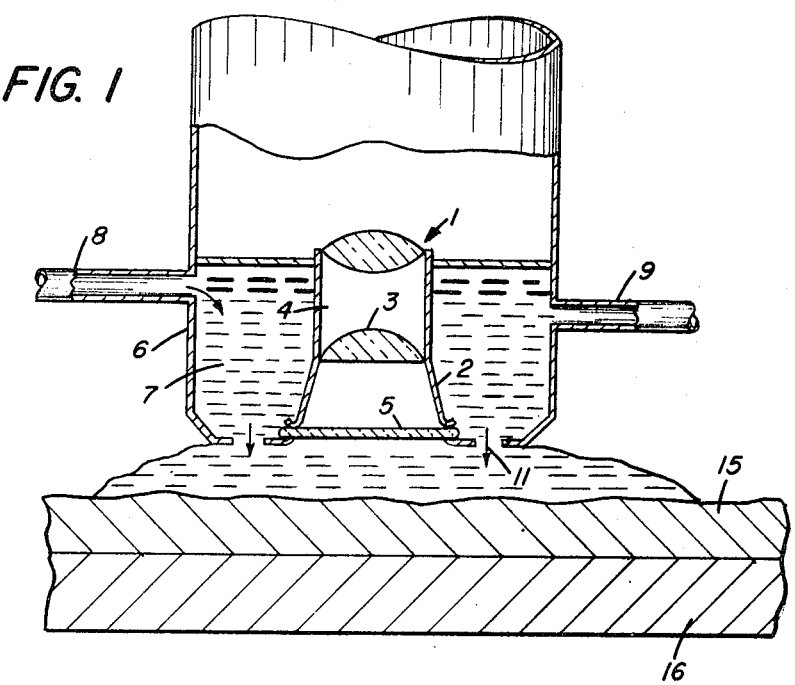
FIG. 1 shows a mainly sectional view, taken on the axis of the objective lens assembly, of part of the first instrument.
Figure 2:
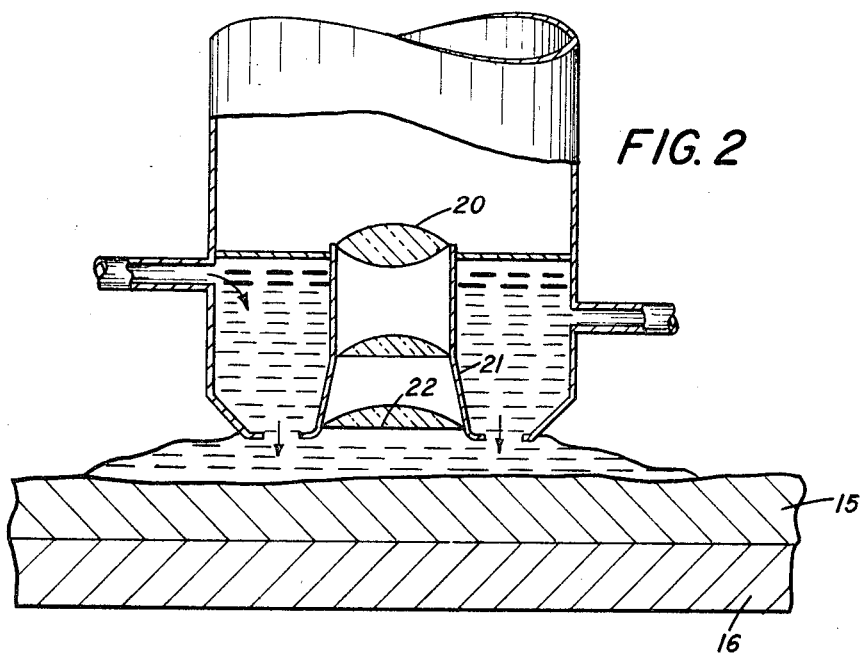
FIG. 2 shows a similar view of part of the second instrument, which includes an objective lens assembly of the liquid immersion type.
Figure 3:
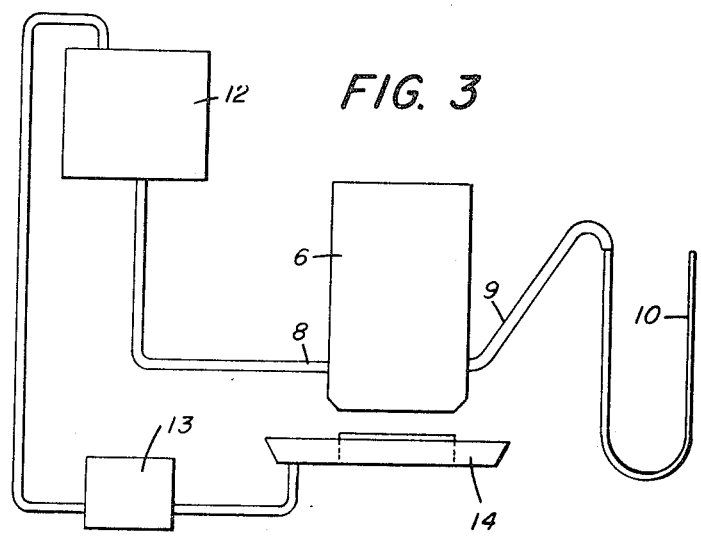
FIG. 3 shows the general arrangement of apparatus used with either instrument.

Referring to the drawings, both instruments are intended to be used in the production of a minute and accurate image on the photographic emulsion surface of a plate to be used for the fabrication of components for microelectronic circuits. The first instrument includes an objective lens assembly 1 of the general type used in compound microscopes but which has a tubular casing 2 extending beyond the front surface of the front lens 3. An airspace 4 is thus provided in front of this front lens 3, and the forward end of the casing 2 is sealed in liquidtight manner by a plane cover glass 5. The casing 2 may have a frustoconical rather than cylindrical shape between the front lens 3 and the cover glass 5 so that the objective lens assembly and nozzle described in greater detail below may be positioned close to the point of image formation.

An outer casing 6 is secured coaxially to the objective lens assembly 1 and its casing 2 and defines a chamber 7 surrounding these parts and extending flush with or just forward of the cover glass 5. The outer casing 6 is formed with an inlet passage 8 and with a connection 9 for a pressure sensing instrument in the form of a manometer 10. The outer casing 6 forms a nozzle around the objective lens assembly 1 and is formed with three nozzle outlets 11, these nozzle outlets being equally spaced around the cover glass 5 at the front of the outer casing 6 and providing a restricted outlet for liquid from the chamber 7. A liquid reservoir 12 is associated with the instrument, and liquid is arranged to be delivered to the chamber 7 at a constant head from the reservoir 12 during operation. For this purpose a precision pump (not shown) may be used associated with the instrument if desired. Pump means 13 are provided for returning liquid to the reservoir 12 after it has flowed over the emulsion surface and been collected in a tray 14.

In operation the objective lens assembly 1 is brought close to the upper surface of the photographic emulsion layer 15 on its support film 16 to focus an image thereon of an object (not shown) to be copied, and with this close spacing the emulsion surface coacts with the nozzle outlets and casing 6 to control venting of the liquid streaming from the chamber 7, in accordance with the spacing. With a constant flow of liquid from the reservoir 12 the pressure in the chamber 7, upstream of the restricted nozzle outlets, is dependent upon this spacing, and variation in the manometer reading from a predetermined value is therefore an indication of a variation from this spacing. An operator may thus be warned to refocus when necessary. The liquid streaming from the chamber 7 maintains a continuously renewed pool of liquid that provides a dust-free zone between the objective lens 1 and the emulsion surface 13, and is returned to the liquid reservoir 12 where it can be reused. The pool of liquid may be considered to be continuously renewed since during operation new liquid issuing from the nozzle outlet continuously displaces "older" liquid already in the pool, the "older" liquid being collected in the tray 14 for recirculation. It may be filtered before being pumped back to the chamber.

It will be appreciated that the photographic emulsion will only be exposed to light during a predetermined exposure, and that conventional techniques will be used for producing a visible image in the emulsion. The manometer will be positioned where it may be seen by the operator but the photographic emulsion will be shielded from undesired light.

Various liquids may be used in carrying out the invention although it is clear that they should not adversely affect the emulsion, for example by causing it to swell. It is preferred, however, that use is made of a liquid such as xylene having approximately the same refractive index, 1.5 to 1.55, as the emulsion which will normally be mainly gelatin. The light rays then enter the emulsion through a medium which is optically homogeneous with the emulsion, so reducing the recording of artifacts due to dust or minute blemishes in the surface of the emulsion. Possible spoiling of the image by refraction is thereby eliminated.

In the second embodiment the objective lens 20 of the optical instrument is of the liquid-immersed type. A cover glass is not then needed and the tubular casing 21 of the objective lens is sealed in liquidtight manner at its forward end by the immersion lens 22 whose forward surface is intended to be contacted by the streaming liquid during use of the instrument. In other respects the instrument and its operation is similar to that described above, and no further description is therefore necessary.

It will be appreciated that the instruments described may be modified in various ways. For example, the instrument may be provided with a single nozzle outlet or with several nozzle outlets through which liquid can flow towards the emulsion surface, providing that these define a restricted outlet from the chamber.

The invention has been described in detail with particular reference to preferred embodiments thereof, but it will be understood that variations and modifications can be effected within the spirit and scope of the invention as described hereinabove and as defined in the appended claims.

I claim:

1. An optical instrument for use in producing a greatly reduced high-resolution photographic copy of an object comprising:
   an objective lens assembly of the liquid immersion type that includes at least one lens having a planar lens surface, said assembly being adapted to be positioned in proximity to a photographic emulsion layer to focus thereon an image of the object to be copied;
   liquid supply nozzle means mounted to move with the objective lens assembly relative to the photographic emulsion layer, and adapted to direct a stream of liquid into contact with the proximately positioned photographic emulsion layer so as to fill the space between the layer and the planar lens surface with a continuously renewed pool of the liquid; and
   a connection adapted to be connected to means for sensing variations in the venting of liquid from the nozzle from that obtaining when the objective lens assembly is correctly spaced from the photographic emulsion layer.

2. An optical instrument as claimed in claim 1 wherein the nozzle surrounds the objective lens assembly coaxially and has a single outlet opening arranged to face the photographic emulsion layer during operation.

3. An optical instrument as claimed in claim 1 wherein the nozzle surrounds the objective lens assembly coaxially and has several outlet openings equally spaced about its axis and arranged to face the photographic emulsion layer during operation.

4. An optical instrument as claimed in claim 1 in combination with means for supplying liquid to the nozzle at a constant head.

5. An optical instrument as claimed in claim 1 in combination with means for sensing variations in the venting of liquid from the nozzle, the said means comprising a pressure sensing instrument in communication with the liquid in the nozzle upstream of a restricted outlet from the nozzle.

6. An optical instrument for use in producing a greatly reduced high-resolution photographic copy of an object comprising:
   an objective lens assembly, said assembly including at least one lens and a transparent cover element airspaced from said lens, said assembly being adapted to be positioned in proximity to a photographic emulsion layer to focus thereon an image of the object to be copied;
   liquid supply nozzle means mounted to move with the objective lens assembly relative to the photographic emulsion layer, and adapted to direct a stream of liquid into contact with the proximately positioned photographic emulsion layer so as to fill the space between the layer and the cover element with a continuously renewed pool of said liquid;
   means for supplying liquid to the nozzle at a constant head; and
   a connection adapted to be connected to means for sensing variations in the venting of liquid from the nozzle from that obtaining when the objective lens assembly is correctly spaced from the photographic emulsion layer.

7. An optical instrument as claimed in claim 6 wherein the nozzle surrounds the objective lens assembly coaxially and has a single outlet opening arranged to face the photographic emulsion layer during operation.

8. An optical instrument as claimed in claim 6 wherein the nozzle surrounds the objective lens assembly coaxially and has several outlet openings equally spaced about its axis and arranged to face the photographic emulsion layer during operation.

9. An optical instrument as claimed in claim 6 in combination with means for sensing variations in the venting of liquid from the nozzle, the said means comprising a pressure sensing instrument in communication with the liquid in the nozzle upstream of a restricted outlet from the nozzle.

10. An apparatus which comprises:
    an objective lens assembly adapted to focus on a photographic emulsion surface spaced therefrom;
    a chamber mounted for movement with said objective lens assembly relative to said photographic emulsion, said chamber being adapted to contain a liquid and having at least one restricted outlet for directing a stream of liquid to fill the space between said objective and said surface;
    liquid supply means in communication with said chamber for providing a constant flow of liquid into said chamber;
    means for collecting said liquid after it has been discharged from said restricted outlet;
    means connecting said collecting means to said liquid supply means to recirculate said liquid; and
    means for sensing pressure variations introduced in said liquid stream by variations in the spacing between said objective and said surface.

11. A method of monitoring the spacing between a microscope objective lens assembly and a photographic emulsion surface on which said objective lens assembly is adapted to focus, said method comprising:
    flowing a stream of liquid, the liquid being of approximately the same refractive index as the photographic emulsion and of a type that will not cause the emulsion to swell, between said objective lens assembly and said surface at a substantially constant flow rate to fill the space therebetween; and
    sensing the pressure variations introduced into said liquid stream by variations in the spacing between said objective lens assembly and said surface.

12. In the production of a greatly reduced high-resolution photographic copy of an object using an objective lens assembly to focus an image of the object on a photographic emulsion layer, the improved method of monitoring the spacing of the objective lens assembly and the said layer and maintaining a dust-free zone therebetween which comprises directing a stream of liquid, the liquid being of approximately the same refractive index as the photographic emulsion and of a type that will not cause the emulsion to swell, into contact with the photographic emulsion layer from a liquid supply nozzle mounted to move with the objective lens assembly relative to the layer, such that the liquid fills the space between the layer and the objective lens assembly when they are proximately spaced with a continuously renewed pool of the liquid, and sensing variations in the venting of liquid from the nozzle from that obtaining when the objective lens assembly is correctly spaced from the layer.

13. The method as claimed in claim 12 wherein the liquid is delivered to the nozzle at a constant head.

14. A method as claimed in claim 12 wherein the liquid is delivered to the nozzle at a constant head, and a manometer connected to the nozzle indicates variations in venting of the liquid from the nozzle.

15. The method as claimed in claim 12 wherein the liquid issues from said nozzle at a substantially constant flow rate.

* * * * *